United States Patent
Deierling et al.

(10) Patent No.: US 9,652,755 B2
(45) Date of Patent: May 16, 2017

(54) METHOD AND SYSTEM FOR SECURELY UPDATING FIELD UPGRADEABLE UNITS

(75) Inventors: Kevin Deierling, Pescadero, CA (US); Aditi Dubey, Redwood City, CA (US); Alexander Gostrer, Sunnyvale, CA (US); Kunal Pankaj Shah, Redwood City, CA (US)

(73) Assignee: SILVER SPRING NETWORKS, INC., San Jose, CA (US)

( * ) Notice: Subject to any disclaimer, the term of this patent is extended or adjusted under 35 U.S.C. 154(b) by 1680 days.

(21) Appl. No.: 12/854,117

(22) Filed: Aug. 10, 2010

(65) Prior Publication Data

US 2011/0040960 A1 Feb. 17, 2011

Related U.S. Application Data

(60) Provisional application No. 61/233,057, filed on Aug. 11, 2009.

(51) Int. Cl.
*G06Q 20/12* (2012.01)
*G06F 21/57* (2013.01)

(52) U.S. Cl.
CPC ....... *G06Q 20/1235* (2013.01); *G06F 21/572* (2013.01)

(58) Field of Classification Search
CPC ........................... G06Q 20/1235; G06Q 30/06
USPC ....................................................... 705/51–59
See application file for complete search history.

(56) References Cited

U.S. PATENT DOCUMENTS

| | | | |
|---|---|---|---|
| 5,826,015 A | 10/1998 | Schmidt | |
| 6,223,284 B1 * | 4/2001 | Novoa | G06F 21/572 709/216 |
| 6,243,809 B1 | 6/2001 | Gibbons et al. | |
| 7,111,292 B2 | 9/2006 | Bonnett et al. | |
| 2006/0107032 A1 | 5/2006 | Paaske et al. | |
| 2006/0159269 A1 | 7/2006 | Braun et al. | |

(Continued)

FOREIGN PATENT DOCUMENTS

| | | |
|---|---|---|
| EP | 1 357 454 A1 | 10/2003 |
| WO | WO 2005/004160 A2 | 1/2005 |

OTHER PUBLICATIONS

International Search Report (PCT/ISA/220) issued on Nov. 30, 2010, by European Patent Office as the International Searching Authority for International Application No. PCT/US2010/002210.

(Continued)

*Primary Examiner* — Calvin L Hewitt, II
*Assistant Examiner* — Cristina Sherr
(74) *Attorney, Agent, or Firm* — Buchanan Ingersoll & Rooney PC

(57) ABSTRACT

Devices and methods for securely upgrading devices, such as field upgradeable units, are disclosed. In response to receiving an update object, a device may determine whether a predefined location of memory includes a predetermined value. Based on the value in the predefined location, the device may store the received update object in a verification portion of the memory. After verifying the authenticity of the update object, the device may copy the update object from the verification portion of the memory to an inactive portion. The inactive portion of the memory can be swapped with an active portion of the memory, such that the inactive portion becomes active.

19 Claims, 4 Drawing Sheets

(56) References Cited

U.S. PATENT DOCUMENTS

2006/0248172 A1* 11/2006 Zurawka ................ G06F 8/665
                                                          709/220
2009/0094421 A1    4/2009  Lewis

OTHER PUBLICATIONS

Written Opinion (PCT/ISA/237) issued on Nov. 30, 2010, by European Patent Office as the International Searching Authority for International Application No. PCT/US2010/002210.
Office Action from Taiwan Patent Office (TIPO) dated Nov. 19, 2013, issued in corresponding Taiwanese Patent Application No. 099126719, with English translation thereof. (20 pages).

* cited by examiner

METHOD AND SYSTEM FOR SECURELY UPDATING FIELD UPGRADEABLE UNITS

CROSS-REFERENCE TO RELATED APPLICATIONS

This disclosure claims benefit of priority to provisional patent application 61/233,057, the contents of which are incorporated herein by reference in their entirety.

FIELD

The disclosed embodiments relate generally to the field of securing computing systems, and more particularly to performing secure program upgrades.

BACKGROUND

It may be desirable to enhance or update the functionality of devices after they are placed in the field for use. Consequently, there is a need to securely update software or firmware in "field upgradeable units" such that an attacker cannot modify the units with bogus information.

Existing systems protect against bogus modifications by signing software with cryptographic keys. For instance, a central office can issue an update to a field upgradeable unit along with a signature. The signature and a central office's private key can be used together to authenticate the update's validity and its source. When an update is issued, the field upgradeable unit authenticates the update using the public key. If the signature matches, the field upgradeable unit can install the update. If the update signature cannot be authenticated, the field upgradeable unit determines that the update is bogus and rejects it.

The authentication of the update relies on an assumption that the central office's private key is used to create a valid signature that can be authenticated with a copy of the public key at the field-upgradeable unit. While the public and private keys may be stored securely, it may be possible for an attacker to obtain the keys. For instance, given sufficient time and computing resources, the attacker may compromise the private key through a brute-force attack on the public key. The public key could be compromised through a 'mole attack', in which a person involved in the production of the field upgradeable unit steals the key. A physical attack may allow access to the public key by acquiring a field upgradeable unit and replacing the entire memory.

An attacker who possesses the central office private key can compromise an entire network. For instance, the attacker could use the private key to distribute a bogus update. Because the attacker's bogus update is signed and/or encrypted with valid keys, the field upgradeable unit decrypts and authenticates the bogus update using its public key. Doing so could enable the node's software or firmware to be updated with invalid and/or malicious software.

One solution to resist such attacks is to update the central office public key stored in each field unit periodically, thereby precluding the use of a compromised central office private key. That is, to resist the brute force attack the central office public key should be updated faster than the key could be derived by the attacker. To resist the mole attack, the central office public key could be updated before the attacker could use the compromised central office private key to replace a field unit's firmware.

SUMMARY

Systems and methods are disclosed for securely upgrading information in devices, such as field upgradeable units. In response to receiving an update object, a device may determine whether a predefined location of memory includes a predetermined value, e.g., a particular command. Based on the value in the predefined location, the device may store the received update object in a verification portion of the memory. After verifying the authenticity of the update object, the device may copy the update object from the verification portion of the memory to an inactive portion of secure memory. The inactive portion of the memory can be swapped with an active portion of the secure memory, such that the inactive portion becomes active.

DETAILED DESCRIPTION

Systems and methods disclosed herein update information in network devices. In some exemplary embodiments, the updated information may include cryptographic keys, software and/or firmware in devices. By updating information in devices, attackers may be prevented from using stolen keys to place bogus information on the devices on a regular basis. For instance, in the event an attacker obtains a copy of a central office private key or in anticipation of an attacker obtaining a copy of a central office private key, the exemplary embodiments disclosed herein allow a network operator to generate at least one new private key and update the corresponding public keys in the network devices before the attacker can use the stolen private key. In addition, the exemplary embodiments thwart the compromise of public keys residing in the network devices.

Figure 1:
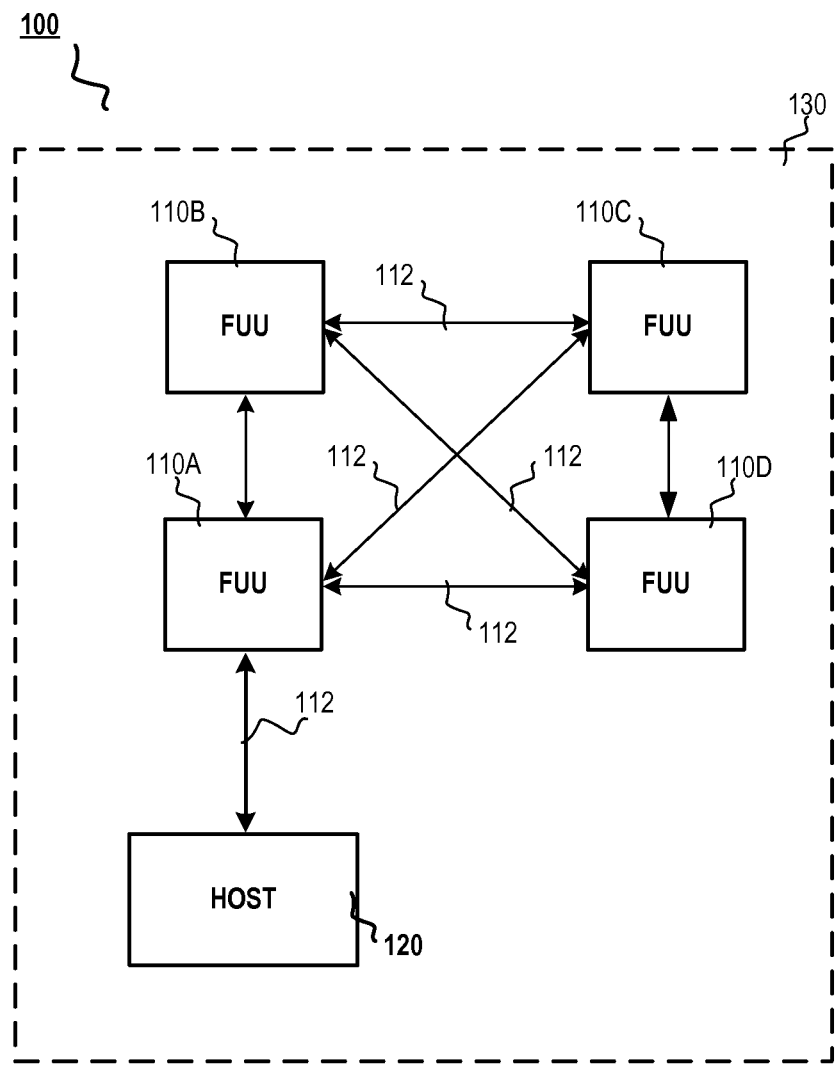
FIG. 1 is a block diagram illustrating an exemplary system including a number of field upgradeable units.

FIG. 1 is a block diagram illustrating an exemplary system 100 including field upgradeable units 110A-110D (collectively "field upgradeable units 110"), a host 120 and network 130. A field upgradeable unit 110 can be any programmable data processing device. For example, a field upgradeable unit 110 can be a general-purpose computer, a server, a network device (e.g., gateway, terminal, switch, repeater, router), an application-specific device (e.g., residential utility meter, remote sensor, set-top box, game device, mobile telephone), or a home appliance (e.g., refrigerator or dishwasher). Host 120 can be any computing and/or communication device operable to communicate and/or receive information over link 112. Host 120 may be, for example, a server, a workstation, a mainframe computer, a mini-frame computer, a desktop computer, a laptop computer, a personal digital assistant, or any other computing or communicating device.

Field upgradeable units 110 may be communicatively coupled to one another and to host 120 via links 112. As used in this disclosure, the term "communicatively coupled" refers to any direct or indirect communication between two or more elements, whether or not those elements are in physical contact with one another. Communication links 112 can be wired, fixed wireless, or mobile wireless links that use a variety of communication protocols. Communications link 112 may include any hardware, software, firmware, or combination thereof. Communications link 112 may, for example, comprise a twisted-pair telephone line, a fiber optic line, a Digital Subscriber Line (DSL), a wireless link, a USB bus, a PCI bus, an Ethernet interface, or any other suitable interface operable to assist in the communication of information to and/or from field upgradeable unit 110. Further, information can be transmitted over communications links 112 within data packets according to packet-switching protocols, such as Transaction Control Protocol (TCP)/Internet Protocol (IP), X.25, and Frame Relay.

Network 130 may comprise any wireless network, wireline network, or combination of wireless and wireline networks capable of supporting communication between network elements using ground-based and/or space-based components. Network 100 can be, for instance, a cable television network, a satellite communications network, a sensor network, or an ad-hoc wireless communications network, a data network, a public switched telephone network (PSTN), an integrated services digital network (ISDN), a local area network (LAN), a wide area network (WAN), a metropolitan area network (MAN), all or a portion of the global computer network known as the Internet, and/or other communication systems or combination of communication systems at one or more locations. Network 130 illustrated in FIG. 1 is a simplified example having only a few generic elements. However, other networks having different numbers and types of elements in different configurations may benefit from embodiments of this disclosure. Network 130 can also be connected to another network, contain one or more other sub-networks, and/or be a sub-network within another network.

In an exemplary embodiment, network 130 can be a wireless smart-grid network that monitors and controls an electrical power generation and distribution service in which the elements of such a network establish communication links 112 with other elements within their transmission range. For example, one field upgradeable unit may exchange information with another by relaying the information over a series of intervening elements of network 130 (or a combination of networks).

Figure 2:
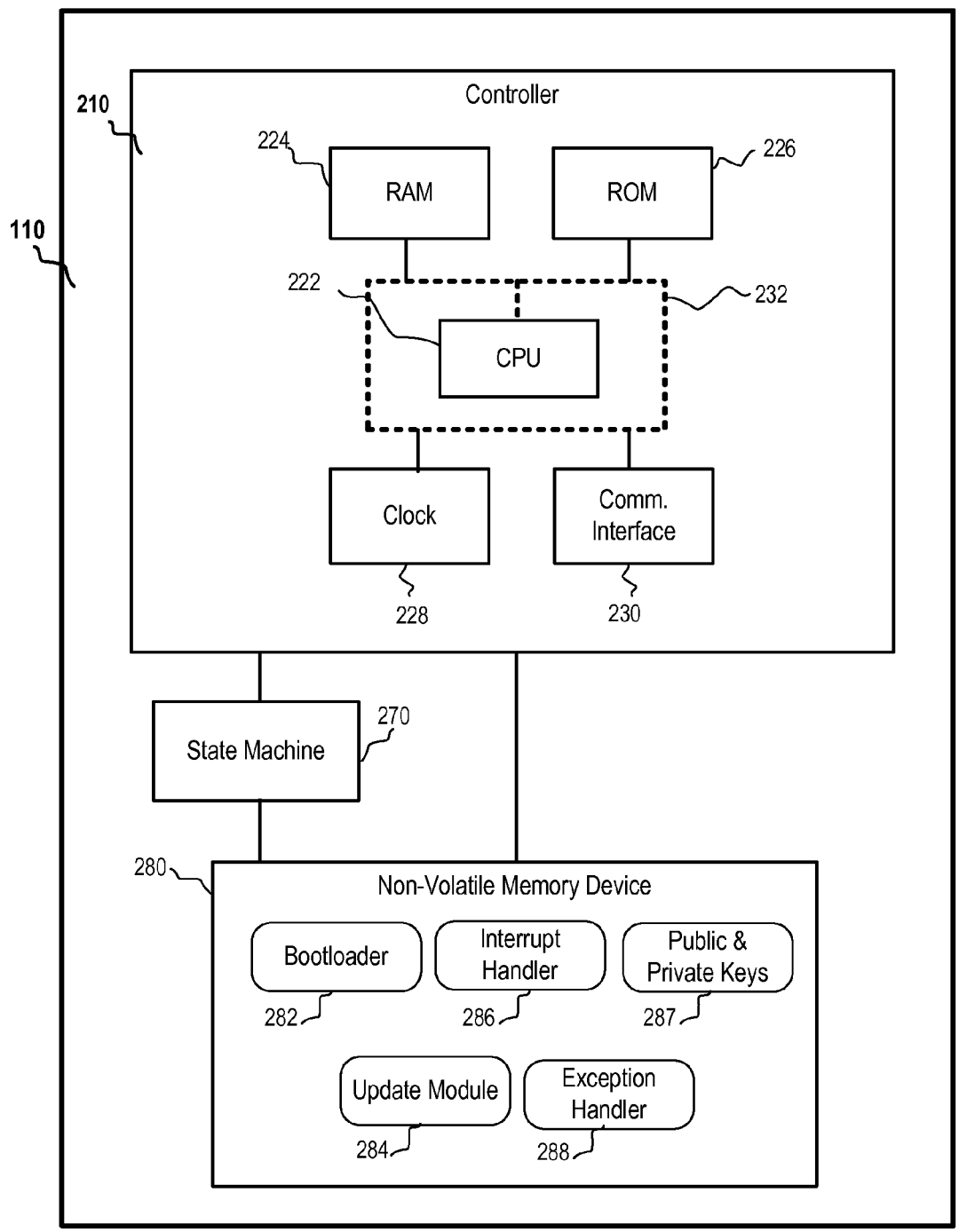
FIG. 2 is a block diagram illustrating an exemplary field upgradeable unit.

FIG. 2 is a block diagram illustrating an exemplary field upgradeable unit 110 having a controller 210. Controller 210 may include any hardware that, in combination with software and/or firmware, is capable of processing at least a portion of programs stored in field upgradeable unit 110. In some embodiments, controller 210 may be a system-on-chip in which substantially all components of controller 210 are integrated into a single integrated device (i.e., chip). Implementing all components of controller 210 on a single chip (e.g., piece of silicon) can thwart attacks by making it very time consuming and expensive for attackers to physically access and modify components of the controller. Moreover, as demonstrated hereinafter, the single chip implementation enables all of the components of the controller to be reset at once, to provide for more effective control over the security of the controller's operation.

As shown in FIG. 2, controller 210 may have a central processing unit ("CPU") 222 communicatively linked to a random access memory ("RAM") 224, a read-only memory ("ROM") 226, clock 228, a communication interface 230, and a data bus 232. CPU 222 is an electronic data processing device that executes program instructions recorded in computer-readable memory devices (e.g., RAM 224, ROM 226 or memory device 280). CPU 222 may be a general-purpose processor (e.g., INTEL), or a specialized, embedded processor (e.g., ARM). Although FIG. 2 depicts controller 210 as a single processing device, controller 210 may comprise multiple processors, a processor array, or any other suitable processor or processors.

Communications interface 230 may include hardware (e.g., modem, network interface card, etc.), software (e.g., multi-layer protocol support, protocol conversion, data processing, data modulation, codec, etc.), firmware, data or combination thereof operable to facilitate communication with one or more elements external to field upgradeable unit 110. In some embodiments, communication interface 230 exchanges information with CPU 222 to encode and decode messages transmitted over communication link 112. For instance, communications interface 230 may receive a message from CPU 222 and convert the information into data packets for transmission over communication link 112 according to the TCP/IP data transmission protocol. Likewise, communication interface 230 device may receive TCP/IP data packets from another one of nodes 110 over communication link 112 and assemble the packets into a message before providing the information to CPU 222. Operating parameters used to configure and control communications interface 230, as well as other components of field upgradeable unit 110, may be stored in the field-upgradeable unit 110's computer-readable data recording devices, such as RAM 224, ROM 226 or memory device 280.

In some embodiments, updates of memory device 280 can be limited by a state machine 270. State machine 270 may prevent controller 210 from altering the contents of non-volatile memory 280. In this way, for example, state machine 270 may protect the non-volatile memory 280 so that updates may only be performed under particular conditions.

State machine 270 may be a digital logic device having a limited number of predefined states, transitions between those states, and actions. State machine 270 may be controlled by a hardware digital circuit comprised of one or more programmable logic devices, programmable logic controllers, data registers, logic gates and flip flops, for example.

A bootloader 282 in non-volatile memory 280 includes instructions that are to be executed by the controller 210 whenever the controller 210 is in an initialization state, such as when the controller 210 is first powered up or is rebooted or otherwise reset. In order for field-upgradeable unit 110 to perform an update of bootloader 282 in non-volatile memory 280, it may be required that state machine 270 is in a particular state that enables the access and/or alteration of the memory device 280. While in such a state, controller 210 may be prevented from executing software, which may be insecure and/or corrupted by an attacker. For example, after field upgradeable unit 110 is reset, controller 210 may execute firmware stored in ROM 226 that updates the memory device's contents. The firmware may disable changes to memory device 280 before relinquishing controller 210 to execute the software.

In some embodiments, the firmware stored in ROM 226 may be such that, when executed, it places state machine 270 in the update state after a hardware reset of field upgradeable unit 110. Firmware may trigger state machine 270 to enter the update state by storing a predetermined value, such as a specific command. For instance, the firmware may write the value to a specified register in RAM 224, and then reset the unit 110. The value stored in this register persists across the reset operation.

In some instances, the firmware can only trigger state machine 270 to exit the update state, but not the reverse direction. As such, the only mechanism to enable an update is through resetting of controller 210. By doing so, it may be ensured that field upgradeable unit 110 is in a secure state before performing an update. Non-volatile memory device 280 may include hardware, software, firmware, or a combination thereof operable to store and to retrieve information, including computer-readable program instructions and data. Memory device 280 may be, for instance, a semiconductor, magnetic or optical-based information storage/retrieval device (e.g., flash memory, hard disk drive, CD-ROM, flash RAM). Although memory device 280 is depicted as a single medium, memory device 280 may comprise a number of storage media. Memory device 280 could reside entirely within controller 210 or, in other embodiments, a part could reside in a location that is outside of controller 210. In some embodiments, it is required that at least one part of non-volatile memory device 280 reside inside the controller 210.

Information stored on memory device 280 may include, for example, software, firmware, code, portions of code, data compilations, a combination of these and/or other type of information. As shown in FIG. 2, memory device 280 may include bootloader 282 and update module 284. In some embodiments (not shown), some or all of update module 284 may be hardwired logic in ROM 226 to ensure the module is secure and cannot be changed by an attacker. Memory device 280 may also store one or more keys for use in cryptographic operations. In some embodiments, keys stored on memory device 280 include public keys 287 corresponding to, for example, private keys of host 120 or some other trusted authority. Further, memory device 280 can store field upgradeable unit 110's secret and/or private keys 287. Memory device 280 can also store other information used in cryptographic operations performed by field upgradeable unit 110.

In some embodiments, bootloader 282 may load a secondary stage bootloader from memory device 280 if the secondary stage bootloader is properly signed. "Properly signed" means signed with a private key (e.g., private key of host 120) associated with one of the public keys 287 (e.g., a "current key" or a "next key" used in a key management protocol of a wireless network security standard, such as "Wired Equivalent Privacy") in memory device 280.

Field upgradeable unit 110 can be updated periodically, randomly and/or manually (i.e., on command). For instance, information received over network 130 (e.g., from another node 110 or host 120), may trigger node 110 to perform an update. The update information may be pushed to or pulled by field-upgradeable unit 110. In some embodiments, the provision of update information to field-upgradeable unit 110 may be initiated by network 130 (e.g., from another node 110 or host 120.) Alternatively or additionally, field-upgradeable unit 110 may retrieve updated information from network 130.

Field upgradeable unit 110 may receive update information from a variety of sources. For instance, a technician may manually couple a device containing an update object to field upgradeable unit 110. In other instances, field upgradeable unit 110 may receive the update information over network 130, via a communication link 112, from host 120 or another one of field upgradeable units 110. Communicating the update information through network 130 is performed, for example, when the update object is stored on another device in network 130.

For the sake of clarity and simplicity, the exemplary embodiments describe update information that corresponds to field upgradeable unit 110's bootloader 282. This disclosure, of course, is not so limited. The update information may comprise, for example, any software, firmware, codes, keys, data compilations, software applications, the state of hardware (e.g., voltage levels of a control pin), and/or combinations of these or any other type of information.

Figure 3:
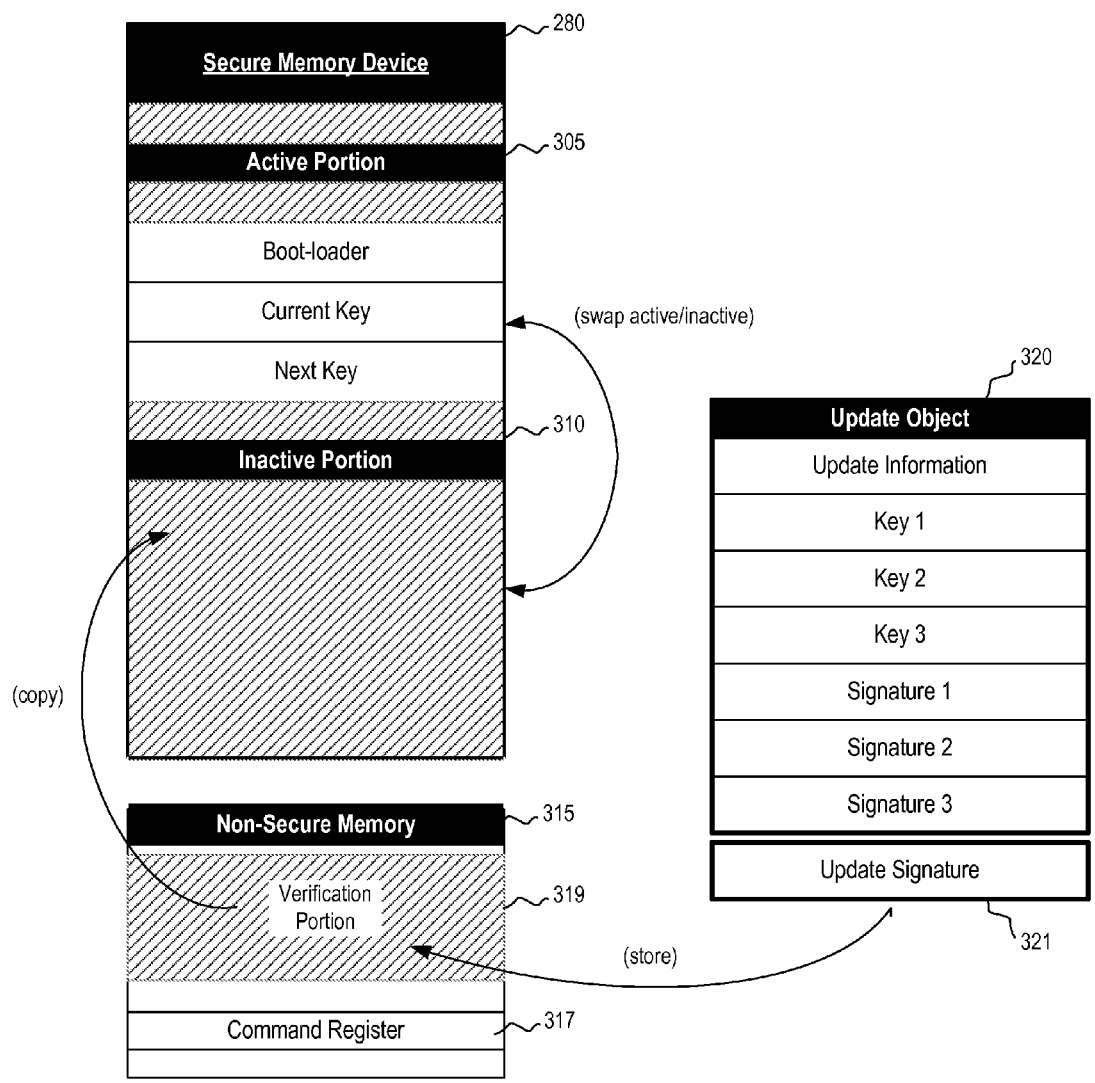
FIG. 3 is a functional diagram of an exemplary memory device in a field upgradeable unit.

FIG. 3 is a functional diagram of an exemplary memory allocation in a field upgradeable unit 110. In this example, the allocated memory includes secure non-volatile memory in the memory device 280, and non-secure memory, e.g., volatile memory that persists across a hardware reset. As illustrated, memory device 280 can be functionally divided into several portions, including an active portion 305 and an inactive portion 310. Initially, active portion 305 of memory device 280 may store two keys, wherein the first key is a current key and the second key is the next key, one or both of which may be used to sign and authenticate the firmware. Also shown in FIG. 3 is an update object 320 that may be used to upgrade the information stored in memory device 280 of field upgradeable unit 110. Update object 320 may include update information that is formatted into a number of sections, including: update information (e.g., program instructions for a bootloader), Key 1, Key 2, Key 3, Signature 1, Signature 2, and Signature 3. In some embodiments, the update object 320 may have an associated update signature 321 that may be provided with (such as being appended to) the update object 320. Key 1, Key 2, Key 3, Signature 1, Signature 2, and Signature 3 may, for example, support a key management protocol used by the operator of network 130.

Secure non-volatile memory device 280 may operate as a "read-only" memory except in certain circumstances, such as when field upgradeable unit 110 is placed in an "update mode" and/or state machine 270 is in the "update state." In some embodiments, field upgradeable unit 110 enters update mode after being reset. Reset may occur remotely or locally. A reset may also be remotely commanded by another field upgradeable unit 110, host 120 or a central authority (not shown) via network 130. In addition, reset may be locally commanded by a physical interface, such as special pin and/or connector (e.g., a Joint Test Access Group ("JTAG") port). More specifically, controller 210 hardware can be configured to detect that update mode is requested by, for instance, monitoring a particular signal, pin or memory register.

Whether memory device 280 is updateable may be controlled by the state of state machine 270. For instance, so long as state machine 270 is not in the update state, non-volatile memory device 280 may function as a read-only device. Upon receiving a predetermined command from controller 210, such as due to the execution of update module 284 in response to receipt of an update object, state machine 270 may place memory 280 into an update state that enables information to be written into non-volatile memory device 280.

In some embodiments, once field upgradeable unit 110 is in the update mode, and/or state machine 270 is in the update state, controller 210 may erase all keys 287 from memory device 280. The erasure may be performed as disclosed in copending application Ser. No. 12/493,707, titled "Integrated Cryptographic Security Module for a Network Node". In such a situation, if field upgradeable unit 110 is placed into the update mode for any reason, including reprogramming memory device 280, the field upgradeable unit 110 must be recertified to rejoin network 130 afterwards. As such, if an attacker were to initiate the update mode, field-upgradeable unit 110 cannot rejoin network 130 without being recertified into the network and/or without receiving a new certificate and/or keys 287 from host 120, another node 110 or a central authority (not shown).

Update module 284 may place field upgradeable unit 110 into update mode by storing update object 320, and its associated update signature 321, if present, in non-secure memory 315 located outside the memory device 280. Update module 284 may then initiate an update by writing a predetermined value, such as an update command, to a predefined location 317 in the memory 315, e.g., a specified command register.

In one embodiment, the state machine can be a two-state device. The two states can be designated "Write-Enable", in which data is permitted to be written into the non-volatile memory device, and "Write-Disable", which causes the memory device to function as a read-only memory.

All interrupts and exceptions may be disabled by execution of an update module 284 by controller 210. For example, update module 284 may cause controller 210 to reset and restart using firmware stored in ROM 226 or memory device 280 that does not include and/or enable interrupt or exception handling software. Alternatively, update module 284 may control CPU 222 to terminate any processes for interrupt or exception handling, such as interrupt handler 286 and exception handler 288.

If field upgradeable unit 110 is in the update mode, controller 210 may execute special upgrade code stored in, for example, ROM 226. Otherwise, controller 210 may execute the normal startup code (e.g., a bootloader). Alternatively, update module 284 may initiate the update mode by triggering state machine 270 to read predefined location 317 in the memory 315. Controller 210 can monitor location 317 and switch into the update mode once this has occurred. Update module 284 can then verify that the information in a verification area 319 is authentic (e.g., a bootloader provided by an operator of network 130 and/or received from a trusted source).

One example of the verification process is described hereinafter with reference to the exemplary update object 320 illustrated in FIG. 3. As noted previously, the update information comprises the particular firmware or software for the field upgradeable unit 110 that is to be updated, e.g. bootloader code. Key 1 corresponds to the "current key" and Key 2 corresponds to the "next key" among the public keys 287 stored in the memory device 280. Key 3 is a new key being provided with the update. Signature 1 is generated (such as by the host 120 or, for example, at the request of the host 120) from the update information, using the private key of the host 120 that corresponds to public Key 1. In one embodiment, the update information itself may be signed with the private key to generate the signature. In another embodiment, described hereinafter, a hash of the update information is first created, and this hash is then signed with the private key to generate Signature 1. In a similar manner, Signature 2 and Signature 3 are generated by signing the update information, or a hash of the update information, with the private keys that correspond to Key 2 and Key 3. In some embodiments, an update signature 321 associated with the update object 320 may also be generated (again, for example, such as by the host 120) by creating a hash of all of the other elements of the update object, namely the update information, Key 1, Key 2, Key 3, Signature 1, Signature 2 and Signature 3, and signing that hash with the private key of the host 120 that corresponds to Key 1.

Upon receiving the update object 320, the update object 320 and signature 321, if present, is loaded into a verification portion 319 of the non-secure memory. An update command is loaded into the predefined location 317, e.g. a command register. The controller 210 is then instructed to perform a hardware reset. For the embodiment employing a state machine having two states, the reset causes the state machine to be set to the "Write-Enable" state. Upon reset, the controller 210 first executes trusted code stored in a secure location, e.g. hardwired firmware in the ROM 226. The code first checks to see whether a request has been issued to perform an update, e.g. an update command is stored in the command register 319. If not, the code resets the state machine to the "Write-Disabled" state, and transfers control to bootloader software stored in the active portion 305 of the secure non-volatile memory device 280.

If the value stored in the predefined location 317 indicates that an update operation is to be performed, the controller 210 validates the command, e.g. checks whether it is on a list of valid commands. For embodiments in which the update object is accompanied by an update signature, after validation of the command the controller applies its current public key (corresponding to Key 1) to the update signature 321 stored in the verification portion 319, to determine a hash value, identified as "hash 1" for reference purposes. The controller separately generates a hash value, identified as "hash 2", from the contents of the update object 320, namely the update information, Key 1, Key 2, Key 3, Signature 1, Signature 2 and Signature 3. Hash 1 and hash 2 are compared, and if they match, the update object is determined to be authentic.

Thereafter, the controller 210 calculates a hash of the update information, identified as "hash 3". Key 1 is applied to Signature 1 to determine a hash value, identified as "hash 4". Hash 3 and hash 4 are compared to see if they match one another. In a similar manner Key 2 is used to generate a hash value from Signature 2, and Key 3 is used to generate a hash value from Signature 3. Each of these generated hash values is also compared with hash 3, to determine whether they match. If the calculated value for hash 3 matches each of the hash values generated from the signatures, the update object 320 is verified.

If the verification fails at any point, update module 284 may cause the update mode to end and cause node 110 to start (or restart) normal operation without updating or affecting the content of memory device 280. Update module 284 may also restart the controller 210 using the existing information in active portion 305 of memory device 280

If all verifications pass, update module 284 copies Key 2, Key 3, and the update information (which, as discussed above, may be a new bootloader) into the inactive portion 310 of secure memory device 280. Another verification may be performed to make sure that all data was copied correctly. If there is no failure, update module 284 sends a command to swap between active portion 305 and inactive portion 310. This swap may be carried out physically, by rewriting the contents of active portion 305 with the contents of inactive portion 310. Alternatively, it can be performed logically, by changing the value of a reference, e.g., a pointer, from the starting address of portion 305 of the memory to the starting address of portion 310 of the memory, thereby making portion 310 the new active portion. As a result of this swap, Key 2 becomes the current key, Key 3 becomes the next key, the new bootloader becomes the current bootloader 282, and Key 1 is discarded.

To further secure the update of memory device 280, if update module 284 detects any access to a memory address outside of the predefined range for controller 210 "upgrade-safe devices" after entering update mode, memory device 280 may control unit 110 to exit from the update mode without affecting the memory device 280's content.

Upgrade-safe devices may be memory blocks inside controller 210 (e.g., RAM 224 or ROM 226) such that reprogramming by an attacker would be very time consuming and/or expensive, and would also require physical access to controller 210 by the attacker. The same result may occur if controller 210 detects any interrupts or exceptions. By doing so, an attacker may be prevented from executing update module 284 from any external device or executing the controller 210 internal code from any entry point while the controller 210 hardware is in the update mode.

Once the verification and transfer of the update object to the active portion of memory is complete, the trusted code resets the state machine to the "Write-Disable" state, and transfers control to the bootloader software. By performing these operations in trusted code that cannot be changed in the field during updates, e.g. hardwired ROM firmware, and resetting the state machine to the "Write-Disable" state before transferring execution to other, updateable firmware, protection from unauthorized alteration of the keys and other updateable objects is enhanced.

In the foregoing example, a hardware reset of the controller is employed as the mechanism to initiate an update. In another embodiment, the update procedure may be initiated by a call to a secure update function stored in the ROM or other secure memory. In this implementation, the trusted code being called can itself set the state machine to the "Write-Enable" state, as well as disable all interrupts and exceptions, as part of the update process.

In yet another embodiment, the secure update function need not be automatically executed upon the occurrence of a reset. Rather, after reset, the controller can first check the predefined location 317 in memory, and determine whether an update command is stored there. If so, it first validates the command and then proceeds to execute the update code stored in the ROM. In this embodiment as well, the update code can set the state machine to the "Write Enable" state instead of having it automatically set to that state by the hardware reset. To ensure proper operation of the update code, a program counter can be used to inhibit the execution of the code if it starts at any location other than the memory address for the first instruction line of the code. In that manner, the state machine will be set to the "Write Enable" state before any other operations are performed that require access to the non-volatile memory device 280.

Figure 4:
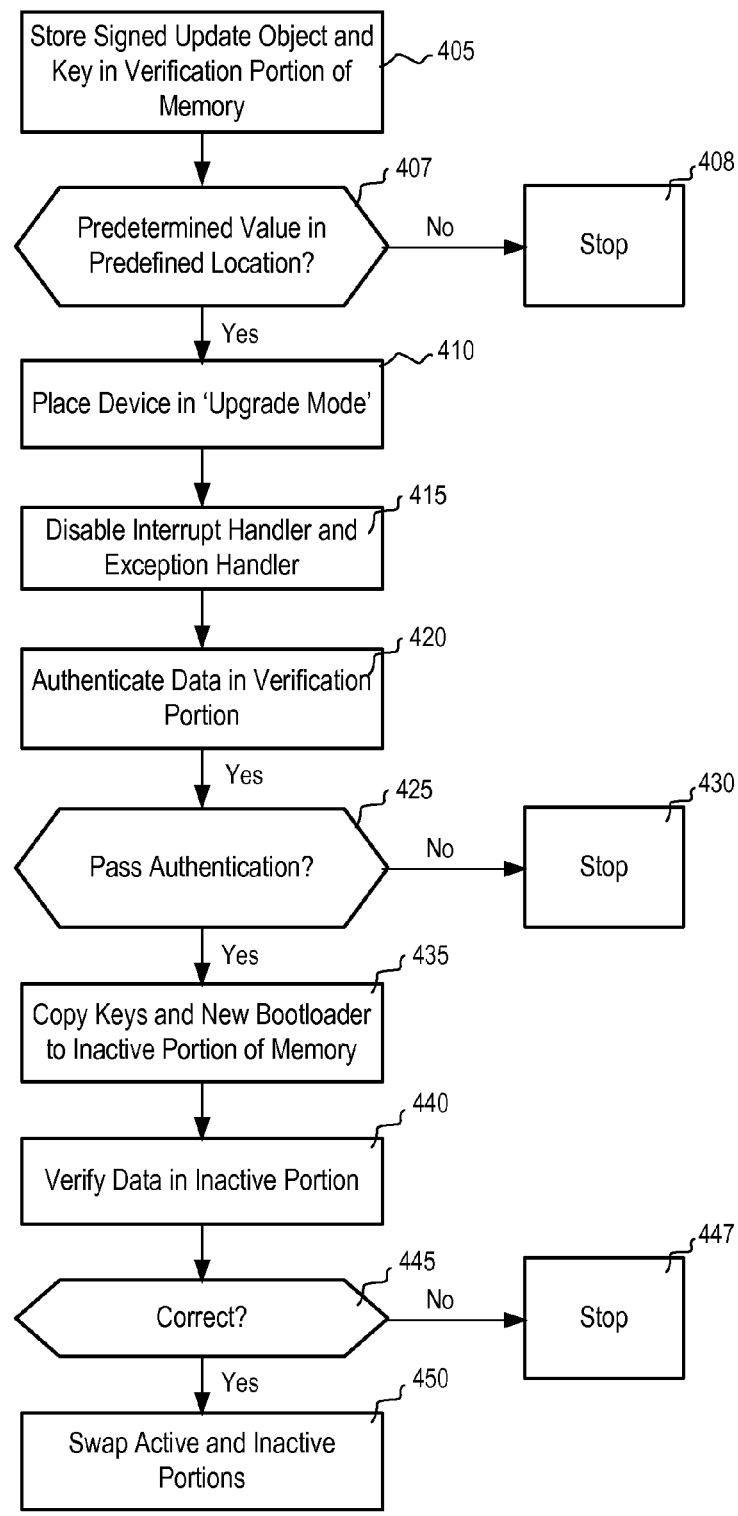
FIG. 4 is a process flow chart illustrating steps performed by an exemplary field upgradeable unit.

FIG. 4 is a process flow chart illustrating steps performed by an exemplary field upgradeable unit 110. First, field upgradeable unit 110 may receive a signed update object 320, and optional update signature, in association with one or more keys (e.g., Key 1, Key 2, Key 3) at Step 405. As described above, the object may be provided directly, such as by a host device operated by a technician, or indirectly, such as over network 130.

In some embodiments, field upgradeable unit 110 may only enter update mode if a predetermined value is stored in a predefined location 317 of memory (Step 407, "Yes"). Otherwise, the update object cannot be stored in memory 280 (Step 408). Furthermore, state machine 270 may be triggered to enter an update state based on whether the predetermined value is stored in the predefined location 317 of memory device 280. When state machine 270 is not in the update state, controller 210 and any software executed by the controller, such as update module 284, may be prevented from modifying the information stored in memory device 280.

Before installing the update object, field upgradeable unit 110 may place itself in update mode (step 410), in which field upgradeable unit 110 disables its interrupt handler 286 and exception handler 288 (step 415) to prevent tampering with the unit during update. For instance, in response to the receipt of an update object, field upgradeable unit 110 may restart using a secure, update mode in which exceptions and interrupts are disabled.

After update object 320, and optional update signature 321, are stored in verification portion 319, update module 284 may authenticate the data in verification portion 319 (Step 420), for example as described previously. If authentication fails (step 425, "No"), the upgrade process ends and/or restarts (Step 430). If authentication passes (step 425, "Yes"), the bootloader 282 and/or Key 2 and Key 3 are copied to inactive portion 310 of memory device 280 (Step 435). In some embodiments, the copies in inactive portion 310 are verified again to ensure that no changes occurred during copying (Step 440).

If update module 284 determines that bootloader 282, Key 2 and Key 3 were successfully copied (step 445, "Yes") to inactive portion 310, update module 284 swaps the inactive portion 310 and the active portion 305 of memory device 280, such that the inactive portion 310, including the new key and bootloader, becomes active automatically (Step 450). Field upgradeable unit 110 may then restart (i.e., reboot) using the new bootloader 282 and keys. In addition, after performing an update, field upgradeable unit may be required to rejoin network 130 including, for example, obtaining a new network certificate from another node 110 or host 120.

The exemplary systems and methods described above provide for the secure updating of network devices such that, if network keys are stolen by an attacker, the keys can be replaced before the attacker has an opportunity to make use of them. Furthermore, by providing the above-described cryptographic, procedural and physical security, the exemplary network devices prevent an attacker from compromising a device's keys or update object while the device is being updated.

As disclosed herein, embodiments and features of the invention can be implemented through computer hardware and/or software. While illustrative embodiments of the invention have been described herein, further embodiments can include equivalent elements, modifications, omissions, combinations (e.g., of aspects across various embodiments), adaptations and/or alterations as would be appreciated by those in the art based on the present disclosure. Other embodiments of the invention will be apparent to those skilled in the art from consideration of the specification and practice of the embodiments of the invention disclosed herein. Further, the steps of the disclosed methods can be modified in various manners, including by reordering steps and/or inserting or deleting steps, without departing from the principles of the invention. It is therefore intended that the specification and embodiments be considered as exemplary only.

What is claimed is:

1. A network device comprising:
   a processor; and
   a memory having program instructions stored therein that, when executed by the processor, cause the network device to perform the following operations in response to receiving an update object having an associated update signature:
   determining whether a predefined location of the memory includes a predetermined value;
   storing, based on said determination, the received update object in the memory;

verifying the authenticity of the update object stored in the memory using the received update signature, wherein the operation of verifying the authenticity of the update includes comparing a first data to a second data, the first data determined by applying, to an update signature received in association with the update object, a public key of the network device, the second data determined by processing the update object; and performing an operation to cause the processor to use update information in the verified update object in lieu of other information stored in the memory.

2. The network device of claim 1, wherein:

the memory further has program instructions to cause the network device to perform the following additional operation:

copying information included in the verified update object from a first portion of the memory to a second portion of the memory;

and wherein the operation of causing the processor to use information in the verified update object in lieu of other information stored in the memory includes causing the processor to use the information copied to the second portion of the memory in lieu of information stored in a third portion of the memory.

3. The network device of claim 1, wherein the operation of verifying the authenticity of the update object includes:

verifying the authenticity of update information within the verified update object using other information within the verified update object.

4. The network device of claim 3, wherein the operation of verifying the authenticity of the update information includes:

using a key, a signature and the update information included in the verified update object.

5. The network device of claim 4, wherein the operation of verifying the authenticity of the update information includes:

comparing a first data to a second data, the first data determined by applying the key to the signature and the second data determined by processing the update information.

6. The network device of claim 4, wherein:

the key is a first key and the signature is a first signature; and the operation of verifying the authenticity of the update information further includes using a second key, a second signature and the update information included in the verified update object.

7. The network device of claim 1, wherein, based on a determination that the predefined location includes the predetermined value, the program instructions cause the network device to prevent processing of interrupts and exceptions by the processor.

8. The network device of claim 1, wherein, based on a determination that the predefined location includes the predetermined value, the program instructions cause the network device to enable the memory to record information.

9. The network device of claim 1, wherein the program instructions cause the network device to sign the received update object using a private key corresponding to the received key.

10. The network device of claim 2, wherein the second and third portions of said memory are located in a secure area of the network device.

11. The network device of claim 1, wherein the network device is a node in a smart grid network.

12. The network device of claim 1, wherein performing the operation to cause the processor to use the update information in the verified update object in lieu of other information stored in the memory includes causing the network device to reboot using the information received in the update object.

13. The network device of claim 12, wherein the information received in the data object includes program instructions for a bootloader.

14. The network device of claim 13, wherein the program instructions cause the network device to transmit a request to join the network after rebooting using the information received in the update object.

15. The network device of claim 1, further comprising a state machine characterized by a plurality of states, said states including a first state in which the network device is configured to prevent the processor from modifying information recorded in the memory.

16. The network device of claim 15, wherein said states of the state machine include a second state in which the network device is configured to enable the processor to modify the information recorded in the memory.

17. The network device of claim 16, wherein the state machine is configured such that the predetermined value in the predefined location of the memory triggers the state machine to enter the second state to enable the processor to modify the information recorded in the memory.

18. The network device of claim 2, wherein the operation of causing the processor to use the information copied to the second portion of the memory comprises:

replacing the contents of the third portion of the memory with the contents of the second portion of the memory.

19. The network device of claim 2, wherein the operation of causing the processor to use the information copied to the second portion of the memory comprises:

replacing a pointer to the third portion of the memory, in said program instructions, with a pointer to the second portion of the memory.

* * * * *